(12) United States Patent
Kuhn et al.

(10) Patent No.: US 9,440,553 B2
(45) Date of Patent: Sep. 13, 2016

(54) ENERGY MANAGEMENT METHOD FOR A VEHICLE AND ENERGY MANAGEMENT DEVICE

(71) Applicant: VOLKSWAGEN AG, Wolfsburg (DE)

(72) Inventors: Mathias Kuhn, Berlin (DE); Tobias Budzynski, Berlin (DE); Jian Lou, Berlin (DE); Sönke Petersen, Berlin (DE); Gustav Hofmann, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 14/641,330

(22) Filed: Mar. 7, 2015

(65) Prior Publication Data

US 2015/0258912 A1 Sep. 17, 2015

(30) Foreign Application Priority Data

Mar. 14, 2014 (DE) ........................ 10 2014 204 789

(51) Int. Cl.
*B60W 10/30* (2006.01)
*B60W 50/14* (2012.01)
*B60W 40/00* (2006.01)
*B60L 11/18* (2006.01)

(52) U.S. Cl.
CPC ........... *B60L 11/1862* (2013.01); *B60W 10/30* (2013.01); *B60W 40/00* (2013.01); *B60W 50/14* (2013.01); *B60L 2250/16* (2013.01); *B60L 2260/52* (2013.01); *B60W 2540/00* (2013.01)

(58) Field of Classification Search
CPC ............ B60L 11/1862; B60L 2250/16; B60L 2250/52; B60W 10/30; B60W 2510/30; B60W 2510/305; B60W 2540/00; B60W 40/00; B60W 50/14; Y02T 10/7283
See application file for complete search history.

(56) References Cited

U.S. PATENT DOCUMENTS 5,539,399 A * 7/1996 Takahira ............ G01C 21/3469
340/636.1
2011/0060495 A1* 3/2011 Kono .................. B60W 40/072
701/31.4

(Continued)

FOREIGN PATENT DOCUMENTS

DE 10138750 A1 2/2003
DE 10302504 A1 9/2004

(Continued)

OTHER PUBLICATIONS

Search Report for German Patent Application No. 10 2014 204 789.7; Jan. 14, 2015.

*Primary Examiner* — Dale Moyer
(74) *Attorney, Agent, or Firm* — Barnes & Thornburg LLP

(57) ABSTRACT

An energy management method for a vehicle having an energy store and consumers, in which the energy reserve in the energy store is detected and a predicted actual range of the vehicle is calculated, a graphic object which visualizes the predicted actual range is generated and displayed, a user input is detected with which a setpoint range is set in that the graphic object is changed by an input device, after the setting of the setpoint range, on the basis of the difference between the setpoint range and the predicted actual range it is calculated by which changes in state of at least one subset of the consumers the setpoint range can be achieved, and the calculated changes in state are output as a proposal. Also disclosed is an energy management device for carrying out this energy management method.

16 Claims, 4 Drawing Sheets

(56) References Cited

U.S. PATENT DOCUMENTS

| | | | |
|---|---|---|---|
| 2012/0116606 A1* | 5/2012 | Ichinokawa | B60K 35/00 701/1 |
| 2012/0143410 A1 | 6/2012 | Gallagher et al. | |
| 2012/0179319 A1* | 7/2012 | Gilman | B60W 50/0097 701/22 |
| 2012/0316714 A1 | 12/2012 | Nagayanagi et al. | |
| 2013/0096818 A1* | 4/2013 | Vicharelli | G01C 21/3469 701/423 |
| 2013/0166123 A1* | 6/2013 | Donald, III | B60L 1/02 701/22 |
| 2014/0074329 A1* | 3/2014 | Yang | B60L 11/1861 701/22 |
| 2014/0163877 A1* | 6/2014 | Kiyama | G01C 21/3469 701/533 |
| 2014/0172285 A1* | 6/2014 | Kuhn | B60L 11/1861 701/123 |
| 2014/0236467 A1* | 8/2014 | Liu | B60L 11/1862 701/123 |
| 2015/0291036 A1* | 10/2015 | Ryu | B60L 1/00 701/22 |

FOREIGN PATENT DOCUMENTS

| | | |
|---|---|---|
| DE | 102010001011 A1 | 7/2011 |
| DE | 102010038539 A1 | 2/2012 |

\* cited by examiner

ENERGY MANAGEMENT METHOD FOR A VEHICLE AND ENERGY MANAGEMENT DEVICE

PRIORITY CLAIM

This patent application claims priority to German Patent Application No. 10 2014 204 789.7, filed 14 Mar. 2014, the disclosure of which is incorporated herein by reference in its entirety.

SUMMARY

Illustrative embodiments relate to an energy management method for a vehicle which comprises an energy store and a plurality of consumers. In addition, illustrative embodiments relate to an energy management device for such a vehicle. The energy management device comprises a sensor device for detecting the energy reserve in the energy store of the vehicle, a computing device, coupled to the sensor device, for calculating a predicted actual range of the vehicle, and a display device, coupled to the computing device, for generating and displaying a graphic object which visualizes the predicted actual range.

Illustrative embodiments provide an energy management method and an energy management device with which the driver of the vehicle can easily and intuitively adapt the energy consumption of the vehicle to his requirements, as a result of which he is enabled, in particular, to ensure that a specific range is achieved.

BRIEF DESCRIPTION OF THE DRAWINGS

The invention will now be explained by means of exemplary embodiments and with reference to the drawings, in which.

DETAILED DESCRIPTION OF THE DISCLOSED EMBODIMENTS

Figure 1:
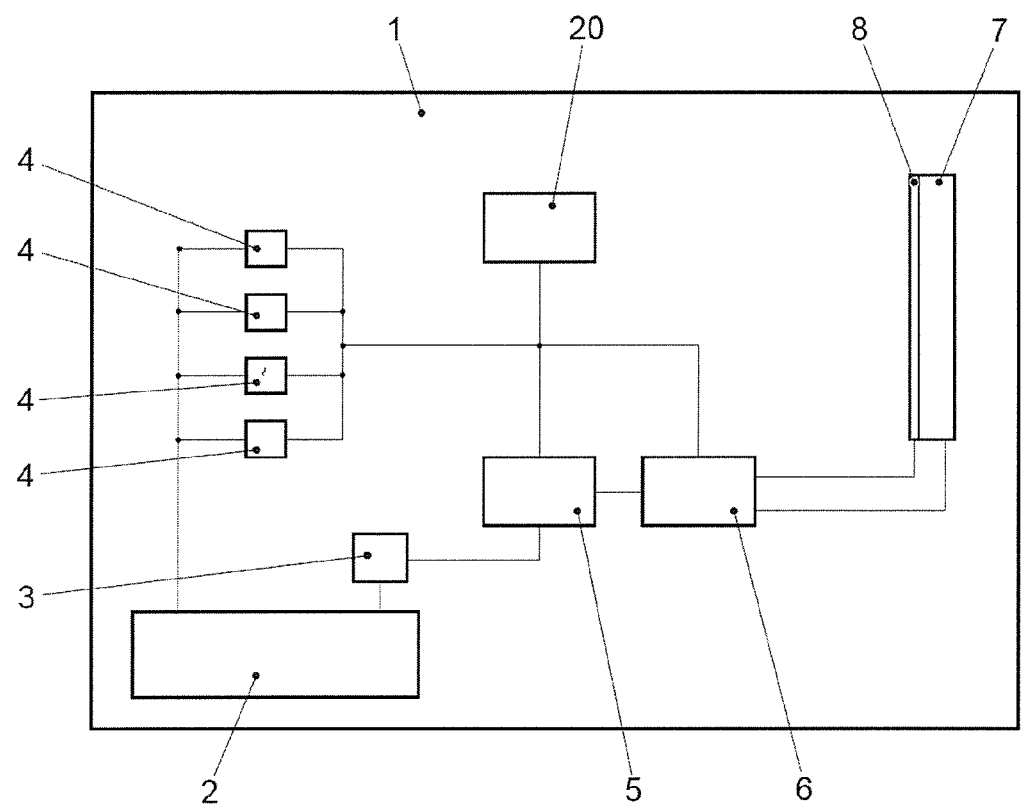
FIG. 1 is a schematic view of the design of an exemplary embodiment of the energy management device.

In the energy management method, the energy reserve in the energy store is detected and a predicted actual range of the vehicle is calculated. Subsequently, a graphic object which visualizes the predicted actual range is generated and displayed. In the method, in addition a user input is detected with which a setpoint range is set in that the graphic object is changed by means of an input device. After the setting of the setpoint range, on the basis of the difference between the setpoint range and the predicted actual range it is calculated by means of which changes in state of at least one subset of the consumers the setpoint range can be achieved. The calculated changes in state are output as a proposal.

In the energy management method, the user can easily and intuitively predefine a desired setpoint range by changing a graphic object. The necessary changes in state of a subset of the consumers which are necessary to change the predicted range of the vehicle in such a way that the desired setpoint range is achieved are subsequently proposed to the user.

According to at least one disclosed embodiment of the energy management method, the graphic object comprises a sliding controller. The sliding controller is displayed, in particular, as a switching element on a display surface. This ensures that the user can very easily and intuitively set the setpoint range by activating the sliding controller.

According to a further disclosed embodiment of the energy management method, the longitudinal extent of the graphic object depends on the predicted actual range. With the user input the setpoint range is set by changing the longitudinal extent of the graphic object by means of the input device. This ensures that the user can set the setpoint range easily and quickly.

According to at least one disclosed embodiment of the energy management method, a destination is detected. In addition, the distance of the vehicle from the destination in a road network is determined. Subsequently, the distance of the destination from a further graphic object in relation to the predicted actual range is displayed. In particular if the predicted actual range is less than the distance from the destination, the user can very easily, on the one hand, recognize that the energy reserve in the energy store is not sufficient to reach the destination. On the other hand, the user can estimate how large the difference between the predicted actual range and the distance from the destination is. In this way he can estimate whether it is necessary to top up the energy reserve of the energy store before the destination is reached, or whether the range of the vehicle can be increased to reach the destination, by reducing consumption of the other consumers which do not serve to drive the vehicle. The road network can be stored here in a manner known per se in a digital map.

If a user input with which the proposal for the changes in state of at least the subset of the consumers is accepted has been detected, control signals for changing the states of the subset of the consumers are generated in accordance with the proposal. The driver can therefore accept the proposal by means of a very fast and simple operator control process to change the states of a plurality of consumers, to increase the setpoint range. This ensures that the driver of the vehicle is distracted as little as possible from driving the vehicle. In this way, the energy management method makes a contribution to safety when driving the vehicle.

After the states of the consumers have been changed, the predicted actual range of the vehicle is calculated again and displayed, with the result that the range display is adapted to the change in the states of the consumers.

According to a further disclosed embodiment of the energy management method, a switching element for modifying the proposal is displayed. If this switching element has been activated, it is output, for the individual consumers of the proposal, how the predicted actual range of the vehicle changes in the event of a change in state of the respective consumer. The user can therefore not only accept the proposal by means of a simple activation but can also cause further information on the proposal to be displayed.

According to another disclosed embodiment of the energy management method, in the proposal itself for individual consumers it is output how the predicted actual range of the vehicle changes in the event of a change in state of the respective consumer. In this case, the user can directly detect the details of the proposal for the changes in state of the consumers.

If the proposed changes in state of the individual consumers of the proposal are displayed, the states of the subset of the consumers of the proposal can be changed individually by means of the input device. If a user input for changing the state of a consumer has been detected an updated predicted actual range of the vehicle is calculated and the display of the graphic object is changed taking into account the updated predicted actual range. The user can therefore recognize how a change in state of an individual consumer acts on the actual range. In this case, the state of the consumer is, if appropriate, not yet changed definitively. This may occur only by means of a further user input. On the other hand, it is also possible that the first user input already changes the state of the consumer, and at the same time the change in the predicted actual range is visualized. In this case, the states of the subset of the consumers of the proposal can be changed individually by means of the input device, and a control signal for changing the state of a consumer is generated if a user input for changing the state of the consumer has been detected.

The consumer is, in particular, thermal consumers for heating and/or cooling the passenger cell of the vehicle. These thermal consumers are, for example, the air-conditioning device for the vehicle and the seat heating systems. The consumers can additionally comprise at least one consumer group which compiles a plurality of individual consumers. For example, a consumer group can relate to the driving profile of the vehicle which can comprise various consumers for the control of the engine.

The energy management device comprises an input device for detecting a user input, with which a setpoint range can be set by changing the graphic object. In addition, after the setting of the setpoint range, by means of the computing device, it can be calculated, on the basis of the difference between the setpoint range and the predicted actual range, by means of which changes in state of at least one subset of the consumers the setpoint range can be achieved. The calculated changes in state can then be output as a proposal by means of the display device.

The energy management device is designed to carry out the energy management method disclosed herein. It therefore also has the same advantages as the energy management method.

The energy management device has, in particular, a control device which is coupled to the computing device. With this control device control signals for changing the states of the consumers can be generated, specifically as a function of a user input with which the proposal has been accepted. Alternatively or additionally, with the control device control signals for changing the state of a consumer can be generated if a user input for changing the state of this consumer has been detected.

Furthermore, the disclosed embodiments relate to a vehicle having an energy store, a plurality of consumers and an energy management device as has been described above. The vehicle is, in particular, a vehicle with an electric drive or what is referred to as a hybrid drive.

Firstly, the basic design of the energy management device will be explained with respect to FIG. 1:

In a vehicle 1, an energy store 2 is provided. This energy store is in the present exemplary embodiment a rechargeable battery. However, it could equally well also be a fuel or a combination of a fuel and a battery as the energy source. By means of a sensor device 3, the energy reserve of the energy store 2 can be detected. The sensor device 3 therefore detects, for example, the state of charge of a battery or the quantity of fuel located in a tank.

The drive for propelling the vehicle 1 is fed by means of the energy store 2. For example, an electric drive for propelling the vehicle draws its energy from this battery. The range of the vehicle therefore depends on the quantity of energy stored in the energy store 2.

Furthermore, the vehicle 1 comprises a plurality of consumers 4 which do not serve to drive the vehicle 1. The consumers 4 comprise, for example, thermal consumers such as an air-conditioning device or a seat heating system and various control devices of the vehicle 1 as well as infotainment devices. The consumers 4 are also supplied with energy by the energy store 2.

Furthermore, the energy management device comprises a computing device 5 which is coupled to the sensor device 3, with the result that data relating to the detected energy reserve of the energy store 2 can be transmitted from the sensor device 3 to the computing device 5. The computing device 5 is also coupled to the consumers 4, with the result that it can detect the state and the energy consumption of the consumers 4. On the basis of the current energy consumption, the computing device 5 calculates a predicted actual range of the vehicle 1. In one development, the computing device 5 can also be coupled to a navigation system 20 of the vehicle 1. Data relating to a route of the vehicle 1 and associated route profiles can be transmitted from the navigation system 20 of the vehicle to the computing device 5. On the basis of this data, the computing device 5 can determine the predicted actual range of the vehicle 1 even more precisely. For example, the computing device 5 can in this case take into account whether route sections on which the energy consumption is relatively high or relatively low are being traveled on.

The energy management device of the vehicle 1 also comprises a control device 6. The control device 6 is coupled to the computing device 5 and the navigation system 20 and also to a display device 7 and to an input device 8. Furthermore, the control device 6 is coupled to the consumers 4 to transmit control signals thereto. The state of the consumers 4 can be changed by means of the control signals, as will be explained later.

The input device 8 is a touch-sensitive surface on a display surface of the display device 7. What is referred to as a touch screen is therefore made available. The user can, inter alia, set a setpoint range for the vehicle 1 or initiate changes in state of the consumers 4 by means of the input device 8, as is explained later.

Further details of the energy management device will be explained below with respect to the description of exemplary embodiments of the energy management method.

Figure 2:
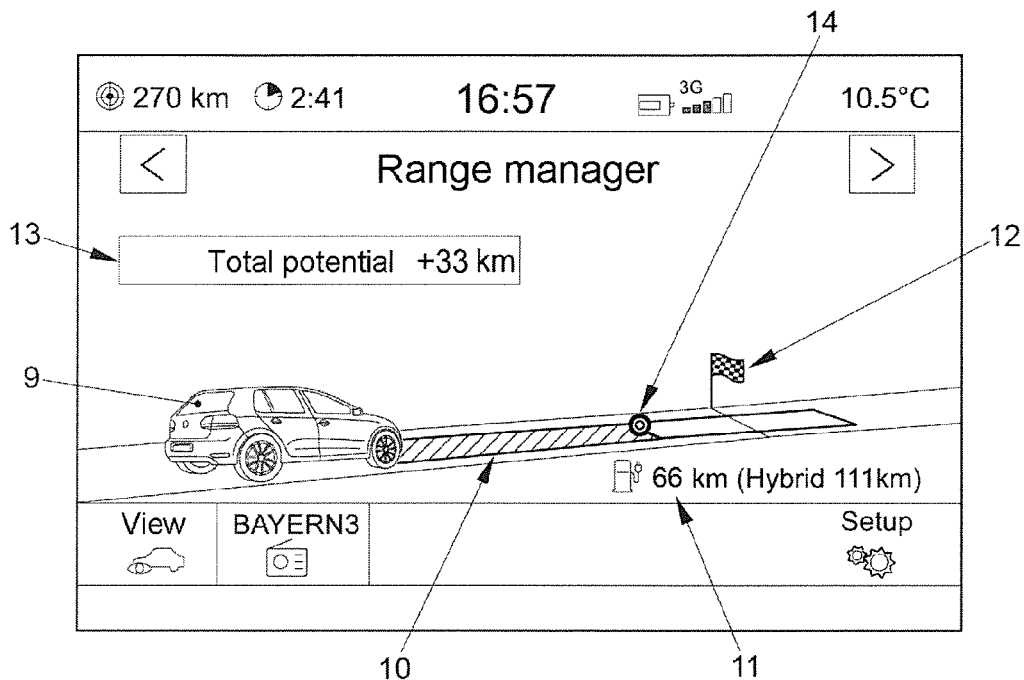
FIGS. 2 to 7 show displays on the display device which are generated by exemplary embodiments of the energy management method.

FIG. 2 illustrates a display which is generated by the energy management method and displayed by the display device 7. A graphic object 9 is displayed which represents the vehicle 1 in question. In addition, a graphic object 10, which visualizes the predicted actual range, is generated and displayed. The graphic object 10 comprises a bar, illustrated in a perspective view, which starts at the graphic object 9 of the vehicle 1 and extends therefrom on a virtual road in a longitudinal direction. The end of the bar comprises a mark 14. The distance between this mark 14 and the graphic object 9 of the vehicle 1, that is to say the length of the bar of the graphic object 10, visualizes the predicted actual range of the vehicle 1 which is calculated by the computing device 5. This predicted actual range is also displayed alphanumerically by a graphic object 11. In the example shown in FIG. 2, the graphic object 11 comprises an indication of a pure battery drive and an indication of a hybrid drive.

Furthermore, a graphic object 12 is displayed which visualizes the distance between the destination of the navigation system 20 and the current position of the vehicle 1. The graphic object 12 for this destination is also represented on the virtual road in the direction of travel of the graphic object 9. On the basis of the geometric relationship between the graphic object 9 for the vehicle 1, the mark 14 of the graphic object 10 and the graphic object 12 for the destination of the navigation system 20 the driver of the vehicle 1 can easily and intuitively recognize whether the predicted actual range is sufficient to reach the destination.

Finally, a graphic object 13 is displayed which represents the potential for increasing the predicted actual range. This potential arises from the energy saving as a result of switching off consumers 4 which are not necessarily required to drive the vehicle 1. The potential is calculated by the computing device 5 and transmitted to the display device 7 by means of the control device 6.

In the example shown in FIG. 2, the driver recognizes that the predicted actual range of the vehicle 1 is not sufficient to reach the destination of the navigation system 20. In such a case, the driver or another user can very easily and intuitively set a setpoint range. All that is necessary for this is to change the graphic object 10 for the predicted actual range.

Figure 3:
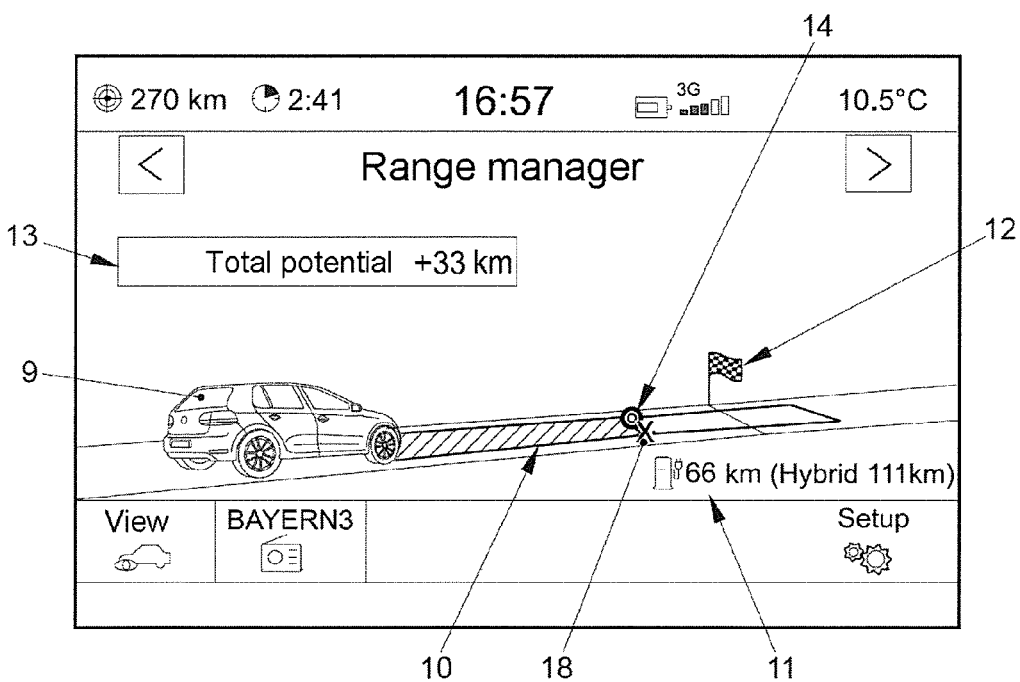
Figure 4:
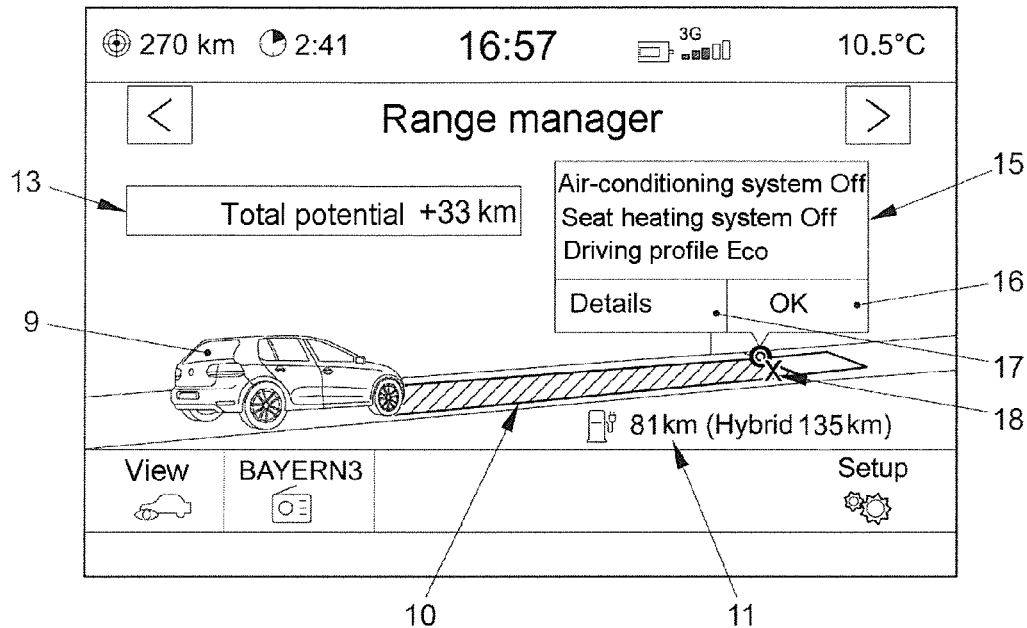

As shown in FIG. 3, for this purpose the user touches the touch-sensitive surface of the input device 8 at the position 18 at the mark 14 of the graphic object 10. On the virtually displayed road the user then moves this position 18 away from the graphic object 9 in the direction of travel of the graphic object 9, as shown in FIG. 4. At the position 18 shown in FIG. 4, the driver releases the touch-sensitive surface again. The graphic object 10 therefore comprises a sliding controller since the mark 14 can be shifted by the user to set the setpoint range.

In this case, the user has set the setpoint range to such a size that the destination which is symbolized by the graphic object 12 can be reached. This user input has been detected by the control device 6, which subsequently changes the graphic object 10, as shown in FIG. 4. Furthermore, after the setting of the setpoint range, the computing device 5 calculates, on the basis of the difference between the setpoint range and the predicted actual range, by means of which changes in state of at least one subset of the consumers 4 the setpoint range can be achieved. On the basis of this calculation, a further graphic object 15, which outputs a proposal for the calculated changes in state, is generated and displayed by the display device 7. In the case shown in FIG. 4, it is proposed that the air-conditioning system and the seat heating system be switched off and the driving profile be set to the state "ECO".

Figure 5:
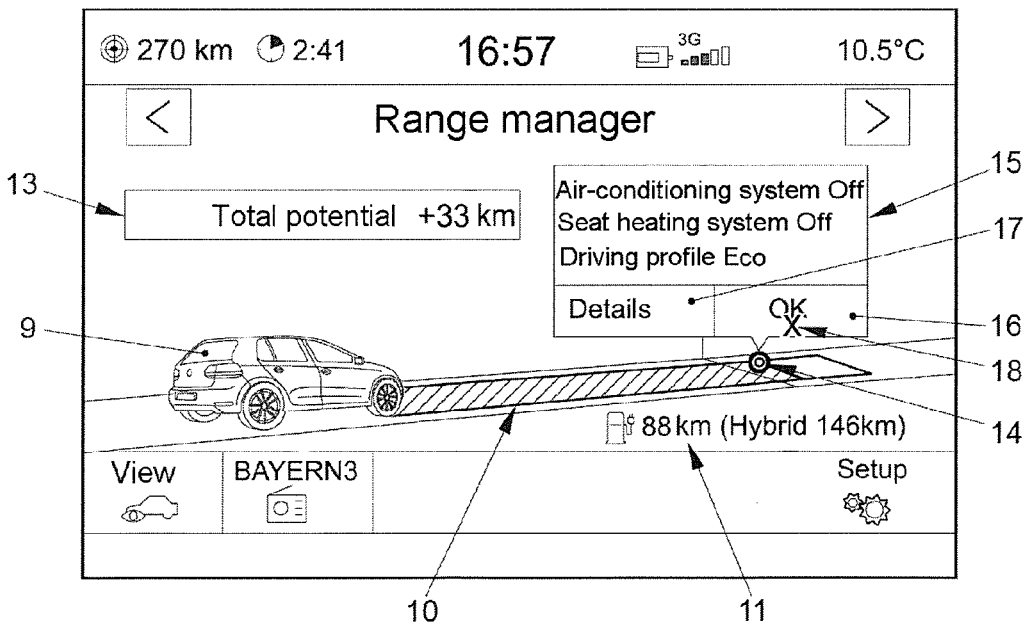

Furthermore, the graphic object 15 comprises switching elements 16 and 17. If the user activates the switching element 16 by touching the touch-sensitive surface 8 at the corresponding position, he accepts the proposal. This is shown in FIG. 5. In this case, the control device 6 generates control signals for corresponding changes in state of the consumers 4. The proposal, calculated by the computing device 5, for changes in state of the consumers 4, can also comprise a change in state for a consumer group which is composed of a plurality of individual consumers. For example, the driving profile combines the settings of a plurality of consumers 4.

Figure 6:
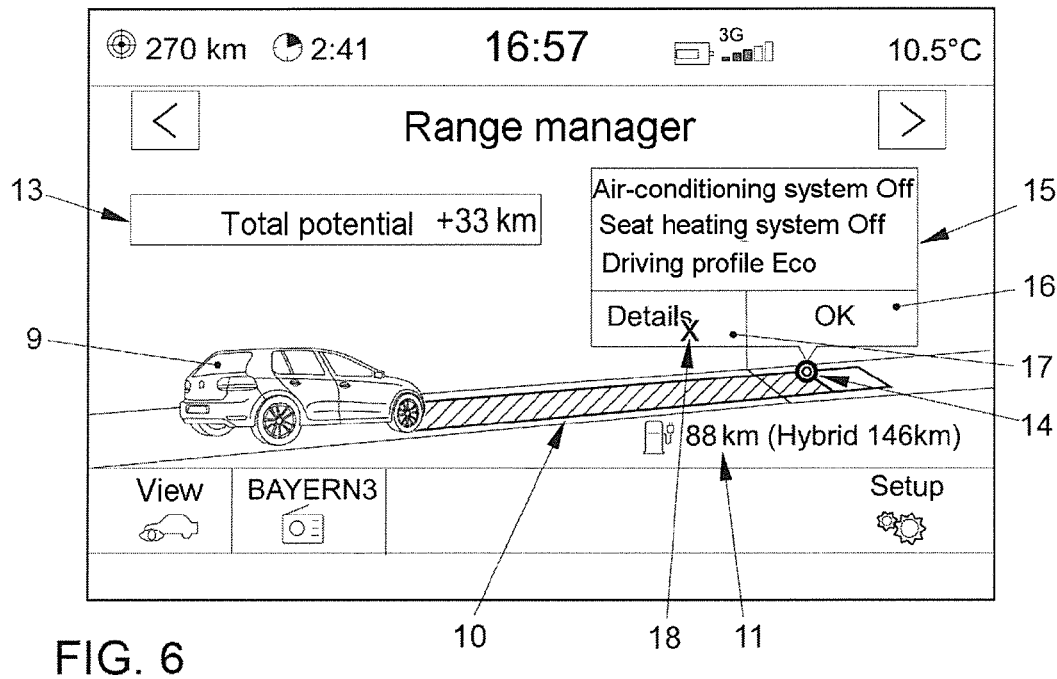
Figure 7:
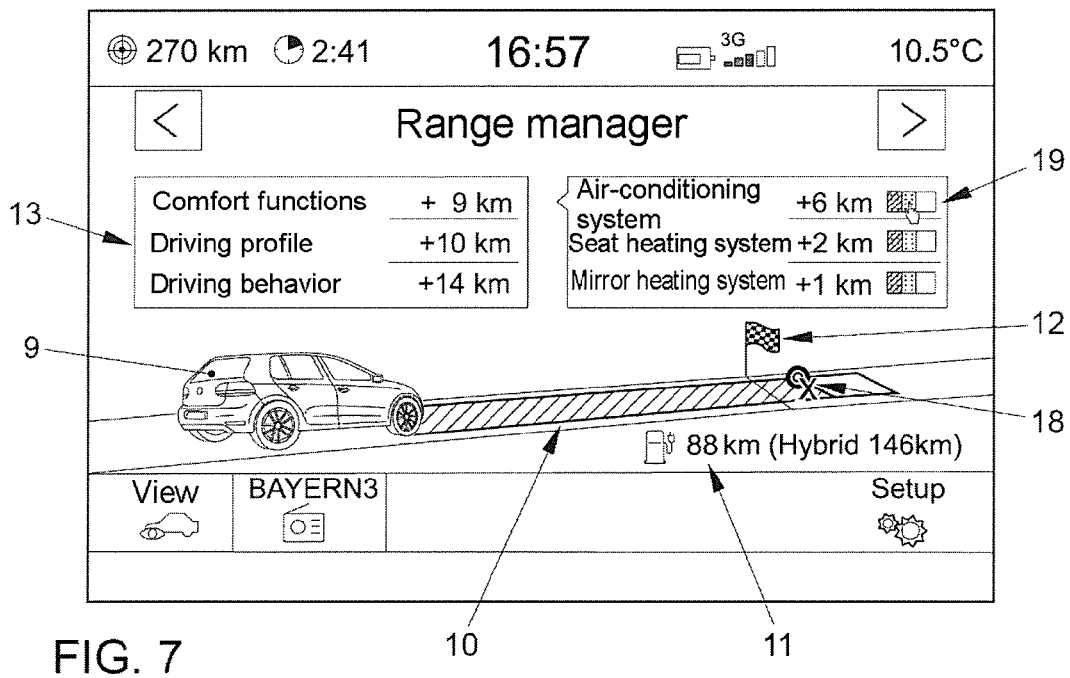

If the user activates the control button 17 as shown in FIG. 6, details on the proposal are displayed. In particular, for individual consumers 4 it is output how the predicted actual range of the vehicle 1 changes in the event of a change in state of the respective consumer 4. This is represented in FIG. 7.

A graphic object 19 which indicates the individual consumers 4 of the proposal is displayed. In addition, the change in range in the event of a change in state of the corresponding consumer 4 is displayed. The user can then directly change the states of the individual consumers 4 by means of the input device 8. Any change in state is converted by means of the control device 6 into a corresponding control signal for the consumer 4. In addition, the computing device 5 calculates an updated predicted actual range of the vehicle 1, which actual range is in turn visualized by means of the display device 7 by changing the graphic object 10. It would also be possible firstly to indicate to the user only the change in the predicted actual range of the vehicle 1 when the switching element for the change in state is activated, and then also to implement the change in state by means of a control signal for the consumer 4 only after a further activation.

In a further exemplary embodiment, on the basis of the display in FIG. 3, when the mark 14 is shifted the graphic object 15 is not displayed but instead the graphic object 19 is displayed immediately with the proposal and the associated details. In this case, the user can accept the proposal or change the states of individual consumers manually. In this case too, during the activation of the control buttons for changing the states of the consumers 4 the energy management method can immediately display the effects on the predicted actual range in that the mark 14 of the graphic object 10 is correspondingly shifted.

DE 10 2010 038 539 A1 discloses a consumption display system for a vehicle. This system comprises a display for displaying consumption information and means for detecting the current energy consumption of the vehicle. A computing unit generates consumption information as a function of the detected energy consumption and displays this information on the display. In addition, a navigation system is connected to the computing unit. The computing unit stores a starting and destination point pair which is detected by the navigation system, and the respectively traveled distance and at least one consumption value which is detected between the starting point and the destination point. This consumption value is displayed on the display when required.

DE 10 2010 001 011 A1 discloses a motor vehicle in which, during purely electric travel, the electrical power consumption of at least one secondary assembly of the motor vehicle can be reduced or it can be completely switched off as a function of driver-side activation of an operator control element, to increase the electric range of the motor vehicle in the case of purely electric travel. The vehicle can also have a monitoring device for the state of charge of an electric energy store. On the basis of the electrical power consumption, this monitoring device can reduce the power consumption of a secondary assembly or switch it off completely. The increase in range achieved hereby is displayed to the driver.

LIST OF REFERENCE NUMBERS

1 Vehicle
2 Energy store
3 Sensor device
4 Consumer
5 Computing device
6 Control device
7 Display device
8 Input device
9 graphic object
10 graphic object
11 graphic object
12 graphic object
13 graphic object
14 Mark
15 graphic object
16 Switching element
17 Switching element 18 Position
19 graphic object
20 Navigation system

The invention claimed is:

1. An energy management method for a vehicle which comprises an energy store and a plurality of consumers, the method comprising:
    detecting the energy reserve in the energy store and calculating a predicted actual range of the vehicle;
    generating and displaying a graphic object which visualizes the predicted actual range;
    detecting a user input with which a setpoint range is set in that the graphic object is changed by an input device;
    calculating a difference between the setpoint range and the predicted actual range;
    calculating changes in state of at least one subset of the consumers based on the difference between the setpoint range and the predicted actual range so that the setpoint range is achieved; and
    outputting the calculated changes in state as a proposal,
    wherein the predicted actual range is determined based on data relating to a route of the vehicle having route sections on which energy consumption is relatively high or energy consumption is relatively low.

2. The energy management method of claim 1, wherein the graphic object comprises a sliding controller.

3. The energy management method of claim 1, wherein a longitudinal extent of the graphic object depends on the predicted actual range, and
    wherein, with the user input, the setpoint range is set by changing the longitudinal extent of the graphic object using the input device.

4. The energy management method of claim 1, wherein a destination is detected, the distance of the vehicle from the destination in a road network is determined, and the distance of the destination from a further graphic object in relation to the predicted actual range is displayed.

5. The energy management method of claim 1, wherein control signals for changing the states of the subset of the consumers are generated in accordance with the proposal when a user input with which the proposal is accepted has been detected.

6. The energy management method of claim 1, wherein a switching element for modifying the proposal is displayed, and
    wherein, when the switching element has been activated, changes for individual consumers included in the proposal specifies how the predicted actual range of the vehicle changes as a result of the change for the respective consumer.

7. The energy management method of claim 1, wherein, a proposal for individual consumers is calculated and includes an indication of how the predicted actual range of the vehicle changes in in response to a change in state of the respective consumer.

8. The energy management method of claim 1, wherein the states of the subset of the consumers included in the proposal is changed individually using the input device, and when a user input for changing the state of a consumer has been detected, an updated predicted actual range of the vehicle is calculated and the display of the graphic object is changed taking into account the updated predicted actual range.

9. The energy management method of claim 1, wherein the states of the subset of the consumers of the proposal is changed individually using the input device, and a control signal for changing the state of a consumer is generated if a user input for changing the state of this consumer has been detected.

10. The method of claim 1, wherein the predicted actual range is displayed alphanumerically as an indication of pure battery drive and an indication of a hybrid drive.

11. An energy management device for a vehicle which comprises an energy store and a plurality of consumers, the energy management device comprising:
    a sensor device for detecting the energy reserve in the energy store of the vehicle,
    a computing device, coupled to the sensor device, for calculating the predicted actual range of the vehicle;
    a display device, coupled to the computing device, for generating and displaying a graphic object which visualizes the predicted actual range; and
    an input device for detecting a user input, with which a setpoint range is set by changing the graphic object,
    wherein, after the setting of the setpoint range, the computing device calculates the difference between the setpoint range and the predicted actual range and calculates changes in state of at least one subset of the consumers such that the setpoint range can be achieved, and
    wherein the calculated changes in state are output as a proposal by the display device,
    wherein the predicted actual range is determined based on data relating to a route of the vehicle having route sections on which energy consumption is relatively high or energy consumption is relatively low.

12. The energy management device of claim 11, wherein the consumers comprise thermal consumers for heating or cooling a passenger cell of the vehicle.

13. The energy management device of claim 11, wherein the consumers comprise at least one consumer group which combines a plurality of individual consumers.

14. The energy management device of claim 11, wherein the energy management device has a control device which is coupled to the computing device and which generates control signals for changing the states of the consumers as a function of a user input that accepts the proposal, or changes the state of a consumer when a user input for changing the state of this consumer has been detected.

15. A vehicle comprising:
    an energy store,
    a plurality of consumers
    and the energy management device according to claim 11.

16. The energy management device of claim 11, wherein the predicted actual range is displayed alphanumerically as an indication of pure battery drive and an indication of a hybrid drive.

* * * * *